United States Patent [19]

Sadhukhan

[11] 4,315,402
[45] * Feb. 16, 1982

[54] HEAT TRANSFER PROCESS AND SYSTEM

[75] Inventor: Pasupati Sadhukhan, Bartlesville, Okla.

[73] Assignee: Occidental Research Corporation, Irvine, Calif.

[*] Notice: The portion of the term of this patent subsequent to Dec. 9, 1997, has been disclaimed.

[21] Appl. No.: 49,621

[22] Filed: Jun. 18, 1979

Related U.S. Application Data

[63] Continuation-in-part of Ser. No. 861,907, Dec. 19, 1977, abandoned, and Ser. No. 907,143, May 17, 1978, Pat. No. 4,238,296.

[51] Int. Cl.$^3$ ............................................... F03G 7/00
[52] U.S. Cl. ..................................... 60/641.3; 60/648; 165/104.13; 165/104.25; 202/173; 202/234; 203/100
[58] Field of Search ............ 60/641, 648, 673, 641 D; 203/11, 88, 100; 202/173, 234; 165/107, 105, 111

[56] References Cited

U.S. PATENT DOCUMENTS

| | | | |
|---|---|---|---|
| 2,749,094 | 6/1956 | Lewis et al. | 165/107 X |
| 4,043,386 | 8/1977 | Franz et al. | 60/641 X |
| 4,084,379 | 4/1978 | Schwartzman | 60/641 |
| 4,238,296 | 12/1980 | Sadhukhan | 203/100 |

Primary Examiner—Allen M. Ostrager
Assistant Examiner—Stephen F. Husar
Attorney, Agent, or Firm—Max Geldin; Walter A. Hackler; William G. Lane

[57] ABSTRACT

Direct contact heat transfer process and system for recovery of energy from geothermal brines or other hot aqueous solutions of a non-volatile solute, or for desalination, using staged evaporator-condenser units operating with a low boiling water-immiscible liquid hydrocarbon. Each stage comprises a closed vessel divided into two compartments, an evaporator and a condenser, by a bubble cap tray similar in construction to those used in distillation. In one embodiment, hot geothermal brine or other hot aqueous liquid is introduced into the liquid hydrocarbon contained in the lower compartment of each stage, causing boiling of the hydrocarbon. Hydrocarbon vapors pass from the evaporator compartment through the bubble caps to the upper condenser compartment where they are condensed in contact with a cooler water stream. The heated water stream under substantial pressure is fed to an expander or turbine to produce work.

In another embodiment using the same staged heat transfer system for desalination, relatively hot fresh water is introduced into the liquid hydrocarbon contained in the lower compartment of each stage, causing boiling of the hydrocarbon, and the hydrocarbon vapors pass from the evaporator compartment to the upper condenser compartment where they are condensed in contact with a colder saline stream. The heated saline stream is flash evaporated and the vapors are condensed with a portion of this condensed stream taken off as product.

19 Claims, 7 Drawing Figures

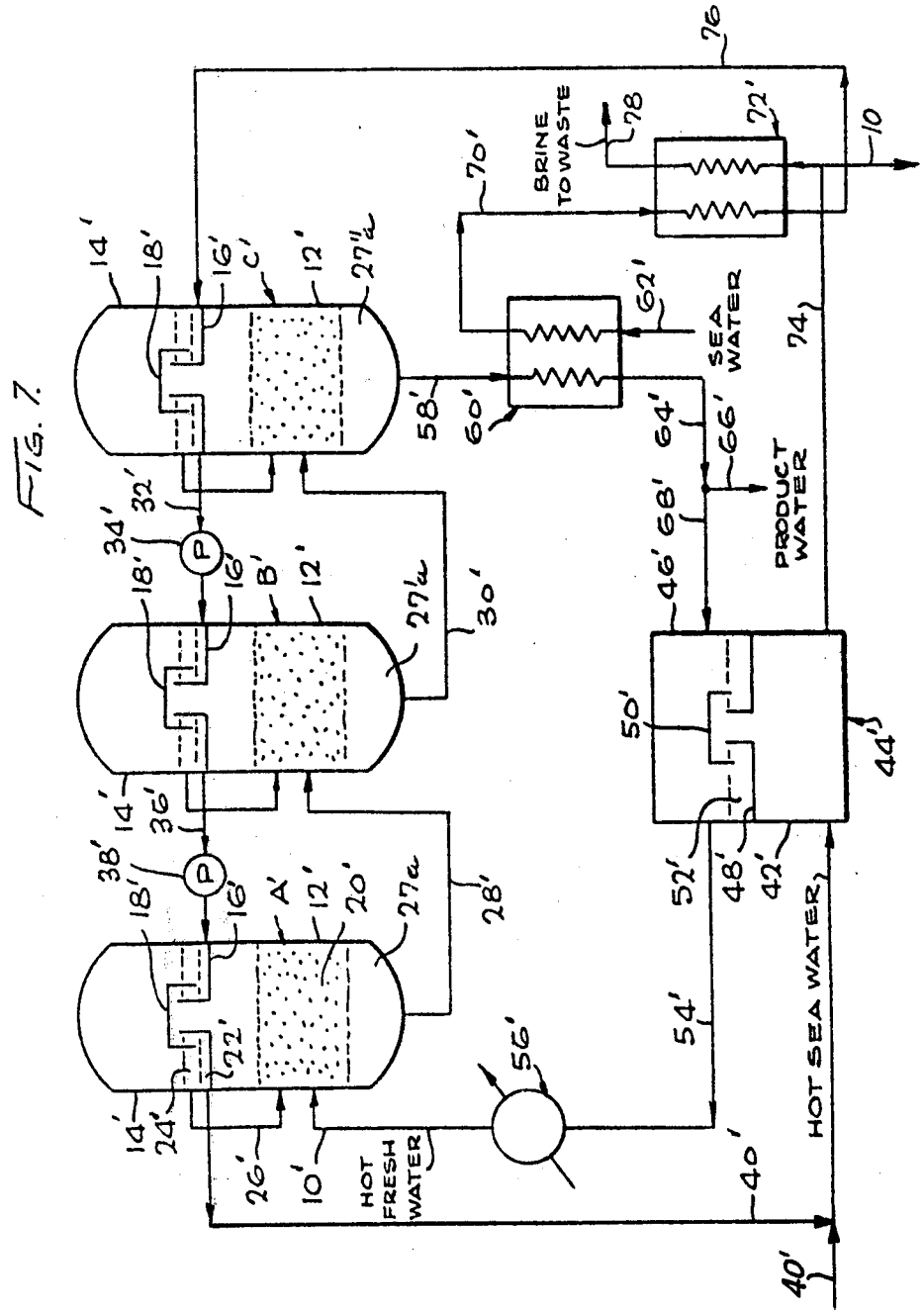

HEAT TRANSFER PROCESS AND SYSTEM

This application is a continuation-in-part of applications Ser. Nos. 861,907, filed Dec. 19, 1977, now abandoned and 907,143, filed May 17, 1978, U.S. Pat. No. 4,238,296.

BACKGROUND OF THE INVENTION

1. Field of the Invention

This invention relates to a heat transfer process for the recovery of energy from geothermal brines and other hot water sources, and for desalination. The invention is particularly concerned with a process and system of the above type employing direct contact heat transfer between the hot brine or other hot water feed and an immiscible liquid, or between hot water and such liquid, particularly a liquid hydrocarbon of relatively low vapor pressure, to cause boiling thereof, and effecting direct contact heat transfer between the resulting vapor and water to condense such vapor and heat the water, or brine, employing an arrangement of staged evaporator-condenser units for carrying out such boiling and condensation operations, and utilizing the heated water in an expander or turbine to produce work, or utilizing the heated salt water to generate fresh water.

2. Prior Art

One of the major problems in various approaches suggested for utilization of geothermal energy is the formation of scale on the heat transfer surfaces in contact with geothermal brine. To avoid such problems flash evaporation of brine to generate steam and subsequent use of the steam for power generation or other applications have been proposed. However, in this approach a large drop of temperature will occur due to flashing and a large fraction of the total heat is lost in the brine rejected. If multi-stage flashing is performed, then the pressure of the steam in the latter stages is generally not high enough to drive a turbine.

These approaches are undesirable so far as efficient utilization of geothermal heat is concerned. To circumvent these problems multi-stage flashing of geothermal brine followed by condensation of the steam to transfer heat by indirect heat exchange to a different liquid, usually an organic liquid, has been suggested. However, the main disadvantage in the above approach is that a large surface area is still needed for heat transfer.

U.S. Pat. No. 3,988,895 to Sheinbaum discloses power generation from hot brines by passing such brine through a heat exchanger in direct contact heat exchange relation with a working fluid such as isobutane. The working fluid is vaporized and the vaporized working fluid is passed through a power extracting gas expansion device.

U.S. application Ser. No. 589,068, S. Woinsky, filed June 23, 1975 and U.S. Pat. No. 4,089,175 disclose recovery of energy from geothermal brines by introducing the geothermal brine in a heat transfer zone in direct heat exchange relation with an organic working fluid, the heat transfer zone maintained above, at or below the critical pressure of the working fluid, and expanding the heated working fluid in an expander to produce work.

Desalination is a growing industry in many parts of the world. Not only the countries with vast areas of arid lands, but the developed and the developing countries also are increasingly producing fresh water by desalination to meet the demands of growing population and rising standards of living.

Multi-stage flash and multi-stage evaporation are the most important processes currently in use for desalination of sea water. These processes suffer from two major disadvantages. In the first place, both require large metallic heat transfer surfaces. The cost of the heat transfer surface for these processes is about 35 to 40% of the total capital investment. Also, the corrosion and scaling of these surfaces are difficult to avoid, thus further increasing the cost by the need for replacement of corroded metallic surfaces. Secondly, the cost of energy requirements for these processes is relatively large, of the order of about $2.00 per 1,000 gallons of fresh water produced. Thus, any desalination process which eliminates, partly or wholly, the need for metallic heat transfer surface and/or requires less energy or a lower quality energy has attractive advantages.

A number of other methods and systems are also in use or being developed for desalination. These latter processes are based on the principles of vapor compression, reverse osmosis, freeze crystallization and ion exchange. All of these latter processes are relatively less attractive.

The improved processes described in the Smith U.S. Pat. Nos. 3,640,850 and 3,856,631 are based on heat transfer with direct contact between immiscible fluids. Hence these systems do not require metallic heat transfer surfaces, and such processes can operate with smaller amounts of energy per unit of water produced and with relatively low quality heat.

In the Smith patents hot sea water is flashed in a flash chamber and the water vapor generated is condensed in direct contact with fresh water. The hot fresh water is now brought in contact with a hydrocarbon liquid, which is immiscible with water. The hydrocarbon evaporates and the vapor is condensed in contact with sea water which is heated due to transport of latent heat released from the hydrocarbon vapor, and the heated sea water is heated further by an external heat exchanger. The hot sea water then enters the flash chamber. Although the use of metallic heat transfer surfaces thus is virtually eliminated, this design involves the flow of hydrocarbon and water in opposing directions and in contact with each other, the hydrocarbon following a substantially horizontal flow path between a plurality of evaporator and condenser units.

Other related but less pertinent prior art is set forth below.

The El-Roy patent, U.S. Pat. No. 3,337,421 shows a multi-stage system in which vaporized hydrocarbon is condensed by direct contact with a saline stream. However, the hydrocarbon is vaporized by indirect heat exchange.

Guptill et al in U.S. Pat. No. 3,392,089 discloses liquid-liquid heat exchange between a hot fresh water stream or condensate from a multiple effect evaporator, and a hydrocarbon stream. The heated hydrocarbon is not vaporized as it is chosen to have a high vapor pressure, and is used to transfer heat to a saline stream, by liquid-liquid heat exchange, and the preheated saline stream is fed to the multiple effect evaporator.

U.S. Pat. No. 3,446,711 discloses the condensation of steam by direct contact with a colder liquid hydrocarbon. The heated hydrocarbon is then passed in liquid-liquid exchange with a cold saline feed stream.

Woodward in U.S. Pat. No. 3,219,554 discloses liquid-liquid heat exchange between a hot fresh water stream and a hydrocarbon and between the heated hydrocarbon and an incoming saline stream. The hydrocarbon has a sufficiently high vapor pressure to preclude any vaporization.

U.S. Pat. No. 3,232,847 to Hoff employs a high boiling hydrocarbon which is passed counter current in liquid-liquid exchange to brine in a heating section and is used as a direct contact condensing medium for steam in a second section.

Osdor, U.S. Pat. No. 3,741,878 discloses a similar system in that a low vapor pressure hydrocarbon is used as a heat exchange medium.

SUMMARY OF THE INVENTION

The invention process broadly comprises in each stage of a plurality of interconnected like stages, directly contacting a hot aqueous first liquid with a water immiscible second liquid having a boiling point lower than said first hot liquid in an evaporator zone, causing said immiscible second liquid to boil, contacting the vapor of said immiscible second liquid generated during said boiling with a third cooler aqueous liquid in a condenser zone, causing condensation of said vapor and heating said third aqueous liquid by transfer of latent heat from the condensing vapor, and recycling said condensed immiscible liquid from said condenser zone to said evaporator zone.

The invention process and system for recovery of energy employs the basic principle of transferring heat from a first hot aqueous liquid, particularly hot geothermal brine, to another aqueous cooler liquid, e.g. fresh water, through the intermediary of a liquid which is immiscible with water, preferably a hydrocarbon liquid, by evaporation of such immiscible liquid, followed by condensation of the vapor, the evaporation and condensation being carried out in direct contact with the hot aqueous solution and with the cooler aqueous liquid, e.g. water, respectively. Thus, the evaporation of the immiscible or hydrocarbon liquid is carried out by contacting the hot aqueous feed liquid or geothermal brine with such immiscible liquid, and the condensation of the hydrocarbon vapor is carried out by contacting such vapor with the second cooler aqueous liquid, e.g. substantially fresh water, to thereby heat such water.

Thus, according to the invention process no metallic heat transfer surface is necessary, and high heat transfer coefficients are achieved due to direct contact between the hot geothermal brine or other hot aqueous feed and the immiscible liquid, and between the resulting vapor of the immiscible liquid and the second aqueous liquid, e.g. fresh water. The absence of metallic heat transfer surfaces, and the compact design of the system of the present invention resulting from such high heat transfer coefficients, lead to a reduction in capital expenditure for equipment, as well as avoidance of scale formation and corrosion problems.

The operating conditions are maintained so as to insure maximum boiling of immiscible liquid or hydrocarbon in contact with the hot aqueous liquid or geothermal brine at a low temperature differential, particularly of the order of about 2°–4° F., between these two phases, and to obtain large volumetric heat transfer coefficients, ranging from about 67,000 to 156,000 Btu/ft$^3$(hr)(°F.), by direct contact between the immiscible phases. These advantageous conditions substantially reduce the sizes of the equipment required for a given rated capacity and increase the operating efficiency.

In the present invention, a plurality of condenser-evaporator units are connected together in a staged operation. Each condenser-evaporator unit has two sections, one for evaporation and the other for condensation of immiscible liquid or hydrocarbon. The two sections are separated by a number of bubble caps. Thus, hot aqueous feed or geothermal brine is introduced, preferably in the form of a jet, into the lower evaporator section of each unit, causing evaporation of the low boiling immiscible liquid or hydrocarbon and the resulting vapor passes through the bubble caps into direct contact with cooler aqueous liquid, e.g. fresh water, in the upper condenser section of each unit, causing condensation of the vapor and heating of the water. The condensed immiscible liquid in the condenser section is then returned or recycled by gravity from the upper condenser section to the lower evaporator section.

For recovery of energy from geothermal brine, the geothermal brine is introduced into the evaporator section of the first stage, and then successively into the evaporator sections of each subsequent stage to the last stage, the temperature of the hot brine being reduced successively in each of the stages. The fresh water feed is introduced first into the condenser section of the last stage of the process and passes successively to the condenser sections of each previous stage to the first stage, the temperature of the fresh water increasing in each successive stage from the last stage to the first stage.

Thus, the immiscible liquid or hydrocarbon medium remains static or stationary in each stage, that is, such liquid does not flow from one stage to the next.

The pressure in the respective stages of the process and system are substantially different. The pressure in each stage increases successively from the last stage to the first stage. Thus, as the fresh water passes from the condenser section of the last stage to the condenser section of each preceding stage to the first stage, the temperature of such water increases from stage to stage and the pressure also increases from stage to stage, so that the fresh water in the condenser section of the first stage has the highest temperature and corresponding highest pressure. The pressure is increased in each stage from the last stage to the first stage so as to maintain the fresh water essentially in the liquid phase throughout the stages as the temperature of the fresh water in each stage from the last stage to the first stage also increases. For this purpose a pump is required between stages for the fresh water, for pumping same from the last stage to each of the preceding stages of higher pressure and finally to the first stage.

However, with hydrocarbon mixtures of appropriate compositions, the pressure in all stages can be maintained substantially equal even though the temperature varies from stage to stage. Equal pressures in the respective stages results in additional economic advantages.

The immiscible liquid medium is a relatively low vapor pressure liquid having a boiling point lower than that of water. Preferably such immiscible liquid is an organic liquid, particularly a hydrocarbon. Such hydrocarbons can be paraffinic hydrocarbons containing from 4 to 7 carbon atoms, such as normal and branched chain butanes, normal and branched chain pentanes, normal and branched chain hexanes and normal and branched chain heptanes. Mixtures of such hydrocarbons also can be employed. Other hydrocarbons also can be utilized such as cyclohexane, benzene, mixtures thereof, and mixtures of any of the above paraffinic hydrocarbons, or hydrocarbon mixtures with benzene and cyclohexane, or mixtures of benzene and cyclohexane.

Although not preferred, immiscible liquids which are more dense than water can be employed, such as chloroform, carbontetrachloride, and dichloromonofluoromethane, provided such higher density liquids also have a boiling point lower than water.

The immiscible or hydrocarbon liquids can have a boiling range from about 60° to about 97° C. at atmospheric pressure.

Preferred immiscible hydrocarbon liquids which can be employed in the process and system of the invention are normal and branched chain butanes, normal and branched chain pentanes, normal and branched chain hexanes, and mixtures thereof.

The hot aqueous solution from which energy can be recovered according to the invention process and system can be any aqueous solution containing a non-volatile solute, particularly salts such as sodium chloride, the invention being particularly directed to recovery of energy from hot geothermal brines.

The hot water in substantially liquid form, and which is under substantial pressure in the condenser zone of the first stage evaporator-condenser unit, is expanded in an expander to produce work. A mixture of water and steam is discharged from the expander, the steam is condensed and combined with the water, and such water together with fresh make-up water is recycled as feed to the condenser section of the last stage of the interconnected evaporator-condenser stages.

The spent cooled aqueous solution of non-volatile solute, e.g. brine, discharged from the evaporator section of the last stage is removed as a waste stream.

When the invention process is used for desalination, hot fresh water is introduced into the evaporator section of the first stage, and then successively into the evaporator sections of each subsequent stage to the last stage, the temperature of the hot water being reduced successively in each of the stages. The sea water feed is introduced first into the condenser section of the last stage of the process and passes successively to the condenser sections of each previous stage to the first stage, the temperature of the sea water increasing in each successive stage to the first stage.

Thus, the immiscible liquid or hydrocarbon medium remains static or stationary in each stage, that is, such liquid does not flow from one stage to the next as do the streams of hot fresh water and sea water, as distinguished from the process and system of the above noted Smith patents.

Fresh water can be recovered according to the invention process and system from any aqueous solution containing a non-volatile solute, particularly salt water or sea water in which such solute is sodium chloride. Examples of other aqueous solutions which can be employed for recovery of fresh water according to the invention, include brackish waters.

The hot aqueous solution of a non-volatile solute, such as sea water, is withdrawn from the condenser zone of the first stage evaporator-condenser unit, and is flashed. The vapor so generated is condensed in direct contact with recycled fresh water withdrawn from the evaporator section of the last evaporator-condenser stage. The resulting recycled fresh water is thus heated by the condensing vapor, and is returned to the evaporator section of the first stage unit, after being further heated by an external energy source to supply the necessary energy of separation. A portion of the fresh water stream withdrawn from the last stage as noted above is removed as product water.

The spent and concentrated aqueous solution of non-volatile solute, e.g. brine, following flashing is removed as a waste stream.

DETAILED DESCRIPTION OF THE INVENTION

The invention will be described in greater detail below, taken in connection with the accompanying drawing illustrating certain preferred embodiments, and wherein:

FIG. 7 is a diagrammatic flow sheet illustrating the process and system of the invention for desalination employing staged evaporator-condenser units.

Figure 1:
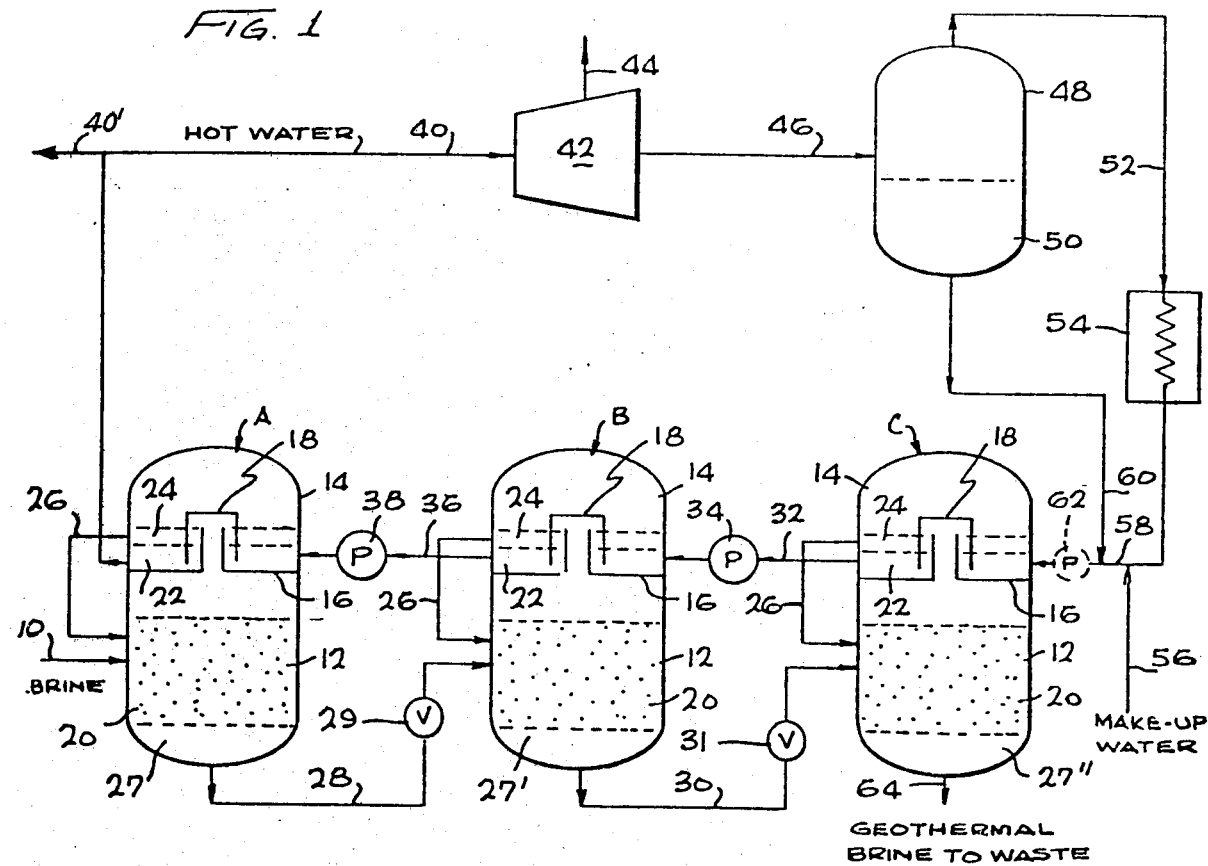
FIG. 1 is a diagrammatic flow sheet illustrating the process and system of the invention for recovery of energy from geothermal brine, employing staged evaporator-condenser units.

Referring to FIG. 1, hot geothermal brine, e.g. at a wellhead temperature of about 400° F. to 600° F., and at a pressure of 250 to 850 psia, is introduced at 10 into the first stage unit A of a series of like evaporator-condenser units, shown as three in number, and including the two subsequent stage units B and C. It will be understood that the number of such stages or evaporator-condenser units can be varied and can be less than three or more than three, depending on the conditions of operation. Each of the evaporator-condenser units contains a lower evaporator section 12 and an upper condenser section 14, separated by an intermediate bubble cap tray 16 between the evaporator and condenser sections, the bubble cap tray 16 containing a plurality of bubble caps of the conventional type, one of which is illustrated at 18.

A body of liquid hydrocarbon, n-pentane, for example, indicated at 20, is maintained in the lower evaporator section 12 of each of the evaporator-condenser units.

Introduction of the hot geothermal brine into the pool of liquid n-pentane 20 in the evaporator section of the first stage unit A produces boiling of the hydrocarbon, and such boiling is maintained during continuous introduction of the hot geothermal brine into the unit A.

For successful operation of the invention process an essential criterion is the provision of conditions which provide intense continuous boiling of the liquid hydrocarbon in each of the stages. The intensity of boiling depends upon the intensity of mixing between the two phases. The Reynolds number with which the hot geothermal brine flows into the hydrocarbon phase can be taken as a measure of the extent of such mixing. The results of experiments show that for an inlet Reynolds number of $8 \times 10^3$ the magnitude of the volumetric heat transfer coefficient is 67,000 Btu/(hr)(ft³)(°F.) without any special design to promote mixing between phases.

However, by appropriate design and incorporation of certain other components and features, intimate mixing between the hot geothermal brine and hydrocarbon phases to promote intense boiling can be assured. With such enhanced mixing, the magnitude of the volumetric heat transfer coefficient can be increased several times that of the value noted above. Thus, as seen in the FIG. 2, the use of a wire mesh block 19 in the body of liquid hydrocarbon in the evaporator section 12 to cause heterogeneous nucleation and mixing of the two phases has been found to be favorable for promoting boiling.

Figure 3:
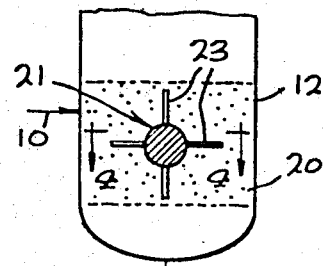
FIG. 3 illustrates a form of wheel having wire screen paddles positioned in the evaporator section of the stages to promote mixing between the liquid phases.
Figure 4:
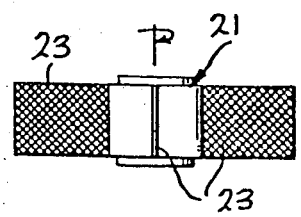
FIG. 4 is a transverse section through the wheel of FIG. 3, taken on line 4—4 of FIG. 3.
Figure 5:
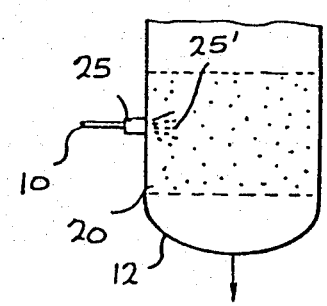
FIG. 5 illustrates introduction of a jet of hot geothermal brine into the evaporator section to enhance the heat transfer coefficient.

As illustrated in FIGS. 3 and 4, the use of a wheel 21, particularly one having wire screen paddles 23 in the evaporator section 12, which rotates to promote turbulence and mixing of the two liquid phases when the hot geothermal brine at 10 is introduced into the body of immiscible liquid or hydrocarbon 20 in the evaporator section and impinges on the wheel, also promotes boiling. Pilot plant tests employing a wheel made of wire screen placed in the evaporator, as in FIGS. 3 and 4, resulted in a volumetric heat transfer coefficient as high as 156,000 Btu/(hr)(ft³)(°F.) with a temperature differential (ΔT) between the hot water and the hydrocarbon of about 3.5° F. Higher coefficients of heat transfer can also be obtained by introducing the hot geothermal brine through a nozzle 25 in the form of a jet 25' at high velocity into the pool of hydrocarbon in the evaporator, as illustrated in FIG. 5.

The immiscible hydrocarbon vapor generated during boiling flows through the bubble caps 18 and is condensed in contact with a relatively cooler layer of fresh water 22 in the condenser section 14 to form a layer of hydrocarbon liquid 24 which floats on the water layer 22. The condensation of the hydrocarbon vapor in contact with the water causes the latter to become heated due to transfer of latent heat released from the condensing vapor. The thickness of the water layer 22 and the rate of flow of the water layer across the condenser should be such that substantially all of the hydrocarbon vapor bubbling through the water layer is condensed therein.

An additional amount of immiscible liquid or hydrocarbon can be added during operation for circulation between the evaporator and condenser of each stage to ensure that a hydrocarbon layer of sufficient thickness is always maintained in both chambers, particularly the evaporator. Any hydrocarbon vapor which escapes condensation in the condenser can be condensed by means of a heat exchanger (not shown). The condensed hydrocarbon, such as n-pentane, at 24 which accumulates at the top of the water layer 22 in each stage, is transferred back to the evaporator section 12 of the unit through a side tube 26. Although the pressure in the evaporator section 12 is usually slightly higher than that in the condenser section 14, the above noted transfer of condensed hydrocarbon liquid from the condenser section to the evaporator section through tube 26 can be achieved by maintaining a sufficient gravitational head of the hydrocarbon liquid in the condenser.

The geothermal brine 27 in the bottom of the evaporator section 12 of the first stage A is transferred via line 28 and valve 29 to the evaporator section 12 of the next stage B and the geothermal brine 27' from the bottom of the evaporator section of stage B, is transferred via line 30 and valve 31 to the evaporator section 12 of the last stage C. The temperature of the geothermal brine passing from the bottom of stage A and progressively to the evaporator sections of stages B and C, decreases monotonically from the first stage A to the last stage C due to the transfer of heat from the hot geothermal brine to the boiling hydrocarbon in the evaporator sections of each of the stages. However, the temperature of the hot geothermal brine entering the evaporator section 12 of the first stage A is sufficiently high, and the other conditions of operation such as the composition of the hydrocarbon in each stage, and the flow rate of the geothermal brine from the evaporator section 12 of the first stage A to the evaporator section of the last stage C, are such that the temperature of the hot geothermal brine entering the evaporator section of the last stage C is still high enough to produce boiling of the hydrocarbon therein.

In a similar manner, fresh water feed in the condenser section 14 of the last stage C is transferred from such condenser section via line 32 and pump 34 to the condenser section 14 of the second stage B, and thence from the condenser section of stage B, via line 36 and pump 38 to the condenser section 14 of the first stage A. The temperature of the water 22 in the condenser section of each stage increases as the water stream flows in the above noted manner from stage C to stages B and A, the water leaving the condenser section of stage A having the desired high temperature due to heat transfer from the hydrocarbon vapor in each of the stages to the water in the condenser section therein. Thus, it is seen that the hot geothermal brine proceeds initially to the evaporator section of the first stage unit A and then progressively through the evaporator sections of the successive stages to the last stage unit C, and the relatively cool fresh water feed proceeds countercurrently or in the opposite direction to the condenser section of the last stage unit C and then successively to the condenser sections of the preceding stages and finally to the first stage unit A.

Since the fresh water stream is being heated to successively higher temperatures in each of the condenser sections 14 in stages C, B and A, the pressures in each of these units is correspondingly increased to maintain the water substantially in liquid form in the condenser section of each stage. The pressures in the respective stages can be readily selected and optimized in accordance with the pressure of the hot geothermal brine feed to the evaporator section of each stage. Also, pressure in the respective stages can be selectively varied by the appropriate choice of liquid composition of the boiling hydrocarbon in each stage. The pressure in the respective stages A, B and C can range from about 0.2 to about 60 atmospheres absolute. Since the pressure in each of the successive stages B and C is reduced from that of the previous stage, the valves 29 and 31 are pressure reducing or throttling valves.

Each of the other evaporator-condenser stage units B and C in the system operate in substantially the same manner as the first stage A, noted above, to provide and maintain intense boiling of the liquid hydrocarbon in the evaporator section by direct contact heat transfer from the hot geothermal brine to the liquid hydrocarbon, passage of the hydrocarbon vapor through the bubble caps and into direct contact with the relatively cooler fresh water in the condenser section, to condense the hydrocarbon vapor and heat the fresh water by transfer of latent heat of vapor condensation to the fresh water, and return of condensed hydrocarbon liquid by gravity through tube 26 to the evaporator section.

Hot water, e.g. heated to a temperature of about 390° F. to 590° F. and at a pressure of about 250 to 850 psia, is fed from the condenser section of the first stage A via line 40 to the intake of an expander 42. The water may contain some steam, depending upon the operating conditions. The expander is a total flow or two phase type turbine operating on a combination of both liquid and vapor phases of the hot water discharge from the condenser section of stage A. The expander or turbine is coupled at 44 to a mechanical device or an electric generator for utilizing the power output of the turbine.

The discharge from the turbine, e.g. at a temperature of about 125° to 150° F., and a pressure of about 1.9 to about 3.7 psia is passed via line 46 to a phase separator 48, where the water is collected at 50. The steam from the phase separator is passed via line 52 to a condenser 54, wherein the steam is cooled and condensed. The condensate from condenser 54, together with make-up water at 56 are combined in line 58, and the water phase in the phase separator 48 is also introduced via line 60 into line 58. The recycled water in line 58 at a temperature of about 125° to 150° F. and at a pressure of about 1.9 to about 3.7 psia, is introduced into the condenser section 14 of the last stage C. If necessary, a pump indicated at 62 can be provided in line 58 to pump the recycled water from the turbine discharge up to the required pressure in stage C.

Figure 6:
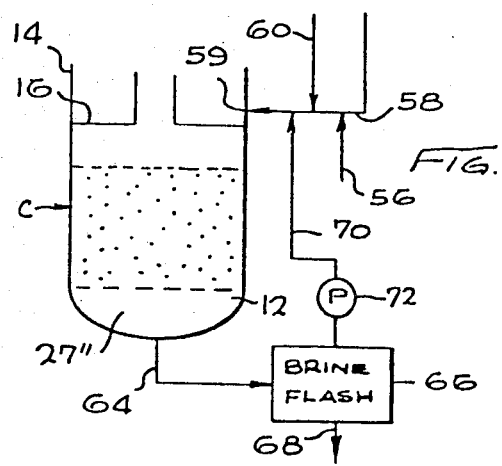
FIG. 6 illustrates a further modification of the invention process and system for recovering energy from geothermal brine.

The cooled geothermal brine at 27″ in the bottom of the evaporator section 12, of the last stage unit C, and at a temperature, for example, of 150° to 165° F. and at a pressure of about 3 to about 5 psia, is withdrawn at 64. As illustrated in FIG. 6 such brine can be flashed at 66 to produce low pressure steam and the spent brine at 68 passed to waste. If desired, such steam can be passed through line 70 and introduced into line 58 by means of pump 72, to heat the recycled water in line 58, prior to reintroduction of such water at 59 into the condenser section of the last stage C.

Referring now to FIG. 7, illustrating the process and system of the invention for desalination, hot fresh water, e.g. at a temperature of about 212° F., is introduced at 10′ into the first stage unit A′ of a series of like evaporator-condenser units, shown as three in number, and including the two subsequent stage units B′ and C′. It will be understood that the number of such stages or evaporator-condenser units can be varied and can be less than three or more than three, depending on the conditions of operation. Each of the evaporator-condenser units contains a lower evaporator section 12′ and an upper condenser section 14′, separated by an intermediate bubble cap tray 16′ between the evaporator and condenser sections, the bubble cap tray 16′ containing a plurality of bubble caps of the conventional type, one of which is illustrated at 18′.

A body of liquid hydrocarbon, n-pentane, for example, indicated at 20′, is maintained in the lower evaporator section 12′ of each of the evaporator-condenser units.

Introduction of the hot fresh water into the pool of liquid n-pentane 20′ in the evaporator section of the first stage unit A′ produces boiling of the hydrocarbon, and such boiling is maintained during continuous introduction of the hot fresh water into the unit A′.

Figure 2:
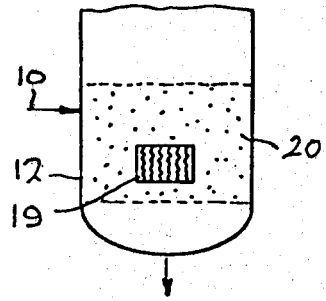
FIG. 2 illustrates the use of a wire mesh in the evaporator section of the stages to promote mixing of the liquid phases.

A wire mesh block as at 19 in FIG. 2 can be employed in the liquid hydrocarbon in evaporator section 12′ of FIG. 7, and a wheel as at 21 in FIGS. 3 and 4 also can be used in such evaporator section, for the purposes noted above. Also, the hot water 10′ can be introduced through a nozzle as at 25 in FIG. 5, into the pool of hydrocarbon in the evaporator section 12′ in FIG. 7, for the purpose noted above.

In FIG. 7, the immiscible hydrocarbon vapor generated during boiling flows through the bubble caps 18′ and is condensed in contact with a relatively cold layer of sea water 22′ in the condenser section 14′ to form a layer of hydrocarbon liquid 24′ which floats on the sea water layer 22′. The condensation of the hydrocarbon vapor in contact with the sea water causes the latter to become heated due to transfer of latent heat released from the condensing vapor.

The condensed hydrocarbon, such as n-pentane, at 24′ which accumulates at the top of the sea water layer 22′ in each stage, is transferred back to the evaporator section 12′ of the unit through a side tube 26′, as described above.

The water 27a in the bottom of the evaporator section 12′ of the first stage A′ is transferred via line 28′ to the evaporator section 12′ of the next stage B′ and the water 27′a from the bottom of the evaporator section of stage B′, is transferred via line 30′ to the evaporator section 12′ of the last stage C′. The temperature of the fresh water passing from the bottom of stage A′ and progressively to the evaporator sections of stages B′ and C′, decreases monotonically from the first stage A′ to the last stage C′ due to the transfer of heat from the hot water to the boiling hydrocarbon in the evaporator sections of each of the stages.

In a similar manner, sea water feed in the condenser section 14′ of the last stage C′ is transferred from such condenser section via line 32′ and pump 34′ to the condenser section 14′ of the second stage B′, and thence from the condenser section of stage B′, via line 36′ and pump 38′ to the condenser section 14′ of the first stage A′. The temperature of the sea water 22′ in the condenser section of each stage increases as the sea water stream flows in the above noted manner from stage C′ to stages B′ and A′, the sea water leaving the condenser section of stage A′ having the desired high temperature due to heat transfer from the hydrocarbon vapor in each of the stages to the sea water therein. Thus, it is seen that the hot fresh water proceeds initially to the evaporator section of the first stage unit A′ and then progressively through the evaporator sections of the successive stages to the last stage unit C′, and the relatively cool sea water feed proceeds countercurrently or in the opposite direction to the condenser section of the last stage unit C′ and then successively to the condenser sections of the preceding stages and finally to the first stage unit A′.

In the process and system of FIG. 7, since two streams of water (fresh water and sea water) are flowing from stage to stage in opposing directions, pumps such as 34′ and 38′ are required for at least one of the streams. It is desirable, however, to maintain pressures in the stages A′, B′ and C′ at such values as to minimize pumping energy. The pressures in the respective stages can be readily selected and optimized for a given variation in temperatures by maintaining the appropriate liquid composition of the hydrocarbon in each stage. By suitable selection of the composition of the hydrocarbon liquids in each stage, pressure in each of the stages can be made approximately equal. Such pressure can range from about 1 to about 5 atmospheres absolute. Thus, although pumps 34′ and 38′ are required for transferring the sea water from one stage to the preceding stage, the pumping energy required for this purpose is minimal.

Each of the other evaporator-condenser stage units B' and C' in the system operate in substantially the same manner as the first stage A, noted above.

The hot sea water is withdrawn from the condenser section of the first stage A' and is passed via line 40' into the evaporator section 42' of a flash evaporator 44', which can be in the form of a multi-stage direct contact condenser and flash evaporator of known design, only one stage 44' of which is shown. The flash evaporator includes a condenser section 46', with a bubble cap tray 48' and bubble caps, one of which is illustrated at 50', separating the evaporator and condenser sections. The water vapor generated during flashing of the hot sea water in the evaporator section 42' passes through the bubble caps 50' and is condensed in direct contact with recycled fresh water at 52' in the condenser section. Such recycled fresh water thus becomes heated due to transfer of the latent heat released in the condensation of the water vapor. The combined stream of condensed water and fresh water at 54' is further heated in a heat exchanger 56' to supply the necessary energy of separation for the desalination, and the resulting hot fresh water at 10' is then introduced into the evaporator section 12' of the first stage unit A', as previously noted. Due to direct contact heat exchange between the phases in the stages A', B' and C, boiling and condensation of immiscible liquid or hydrocarbon can occur with smaller temperature difference therebetween, and the thermal efficiency of the process is enhanced. Consequently, the heat input source illustrated by the heat exchanger 56' can employ low quality heat energy such as relatively low pressure steam. The heat exchanger 56' can be, for example, a tube-type heat exchanger wherein the recycled heated fresh water stream is passed through tubes in a jacket in countercurrent relation to steam flowing through the jacket.

The cooled fresh water at 27"a, in the bottom of the evaporator section 12' of the last stage unit C', and at a temperature, for example, of about 120° F., is passed via line 58' through a heat exchanger 60' to transfer any residual heat to the incoming sea water feed 62'. A portion of the exiting fresh water at 64' is withdrawn as product water at 66', while the remaining portion of the fresh water is recycled via line 68' to the condenser section 46' of the evaporator-condenser 44' for flashing the hot sea water. The sea water feed 62' exiting the heat exchanger 60' is passed via line 70' through a second heat exchanger 72' in heat exchange relation with spent concentrated sea water or brine at 74 withdrawn from the flash evaporator 44'. Thus, the residual heat from the flashed spent sea water is recovered by heat transfer to the incoming sea water feed. The resulting warm sea water feed exiting heat exchanger 72', at a temperature for example of about 110° F., is passed via line 76 into the condenser section 14' of the last stage evaporator-condenser unit C', and the spent brine discharged from the condenser 72' is conducted via line 78 to waste. The arrangement of the heat exchangers and the flows of the streams 58', 62' and 74 can be varied, since the detailed heat and material balance may necessitate different arrangements of these flows to attain desired temperatures of the streams. Thus, for example, instead of introducing all of the incoming sea water feed 62' into the condenser section 14' of the last stage C', a portion of such stream may be required to be rejected after passing through heat exchanger 60' and cooling the fresh water stream coming from the evaporator section of the last stage C', in order to maintain the proper heat balance of the process.

The processes and systems of FIGS. 1 and 7 also can be combined. Thus, for example, hot flashed sea water at 74 or 78, in the desalination process illustrated in FIG. 7 can be introduced at 10 into the process illustrated in FIG. 1 for recovery of energy from such sea water or from a hot aqueous liquid containing a non-volatile solute, providing that proper heat balances exist.

Also, a portion of the hot water at 40 in the energy recovery process illustrated in FIG. 1 can be introduced at 10' into the desalination process illustrated in FIG. 7.

From the foregoing, it is seen that the invention provides a simple process and system of improved performance, reliability and efficiency for recovery of energy from a hot aqueous solution of a non-volatile solute such as aqueous salt solutions, particularly from hot geothermal brine, employing the basic principles of the invention embodying direct contact heat exchange between such hot aqueous liquid and a water immiscible liquid to produce boiling thereof, and condensation of such boiling vapors with fresh water for heating same, and utilizing such heated water as the power fluid for operating a turbine.

The invention also provides a simple process and system of improved performance, reliability and efficiency for producing fresh water from an aqueous solution of a non-volatile solute, particularly from sea water or brine. The basic principles of the invention process and system for heat transfer from one fluid to a second fluid can also be employed to transfer or transport heat from geothermal and ocean brine to other fluids for various applications.

While I have described particular embodiments of my invention for purposes of illustration, it is understood that other modifications and variations will occur to those skilled in the art, and the invention accordingly is not to be taken as limited except by the scope of the appended claims.

What is claimed is:

1. A heat transfer process which comprises in each stage of a plurality of interconnected like stages:
    directly contacting a hot aqueous first liquid with a water immiscible second liquid having a boiling point lower than said first liquid in an evaporator zone, causing said immiscible second liquid to boil;
    contacting the vapor of said immiscible second liquid generated during said boiling with a cooler aqueous third liquid in a condenser zone, causing condensation of said vapor and heating said third liquid by transfer of latent heat from the condensing vapor; and,
    recycling said condensed immiscible second liquid from said condenser zone to said evaporator zone.

2. The process as defined in claim 1, including:
    passing said hot first liquid cooled by the boiling of said immiscible second liquid in said evaporator zone of the first stage of said plurality of stages, to the evaporator zone of a succeeding stage; and,
    introducing said cooler aqueous third liquid into said condenser zone of said first stage from the condenser zone of said succeeding stage.

3. The process as defined in claim 1, including:
    passing said hot aqueous first liquid in said evaporator zone of the first stage of said plurality of stages, to the evaporator zone of each successive stage, for boiling of said immiscible second liquid therein; and, passing said third aqueous liquid as feed into the condenser zone of the last stage of said plurality of stages and then to the condenser zone of each preceding stage, for condensing said vapor of said immiscible second liquid in each of said condenser zones.

4. The process as defined in claim 3, wherein each of the stages from the last stage and proceding to the first stage is at a substantially higher pressure than the succeeding stage, each of the stages being at a sufficiently high pressure in relation to the temperature therein to maintain said aqueous third liquid in the condenser zone of each stage essentially in the liquid form.

5. The process as defined in claim 3, wherein each stage is at substantially the same pressure.

6. The process as defined in claim 1, including:
providing bubble caps in each of said plurality of stages, said bubble caps separating the evaporator zone and the condenser zone of each stage; and, wherein the step of contacting the vapor of said immiscible second liquid with a cooler aqueous third liquid includes flowing the immiscible second liquid vapor through said bubble caps and into contact with said cooler aqueous third liquid in the condenser zone of said stages.

7. A heat transfer process which comprises in each stage of a plurality of interconnected like stages:
directly contacting a hot aqueous first liquid with a water immiscible second liquid hydrocarbon having a boiling point lower than said first hot liquid in a evaporator zone causing said immiscible second liquid hydrocarbon to boil;
contacting the vapor of said immiscible second liquid hydrocarbon generated during said boiling with a third cooler aqueous liquid in a condenser zone, causing condensation of said vapor and heating said aqueous third liquid by transfer of latent heat from the condensing vapor; and,
recycling said condensed immiscible second liquid from said condenser zone to said evaporator zone.

8. A heat transfer process which comprises in each stage of a plurality of interconnected like stages:
directly contacting a hot aqueous first liquid with a water immiscible second liquid having a boiling point lower than said first hot liquid in an evaporator zone, causing said immiscible second liquid to boil, said immiscible second liquid being a paraffinic hydrocarbon containing from 4 to 7 carbon atoms;
contacting the vapor of said immiscible second liquid generated during said boiling with a cooler aqueous third liquid in a condenser zone, causing condensation of said vapor and heating said aqueous third liquid by transfer of latent heat from the condensing vapor; and,
recycling said condensed immiscible second liquid from said condenser zone to said evaporator zone.

9. A heat transfer process which comprises in each stage of a plurality of interconnected like stages:
directly contacting a hot aqueous first liquid with a water immiscible second liquid having a boiling point lower than said first liquid in an evaporator zone, causing said immiscible second liquid to boil, said immiscible second liquid being a hydrocarbon selected from the group consisting of normal and branched chain butanes, pentanes, hexanes and mixtures thereof;
contacting the vapor of said immiscible second liquid generated during said boiling with a cooler aqueous third liquid in a condenser zone, causing condensation of said vapor and heating said aqueous third liquid by transfer of latent heat from the condensing vapor; and,
recycling said condensed immiscible second liquid from said condenser zone to said evaporator zone.

10. A heat transfer process for recovery of energy from hot aqueous liquids containing a non-volatile solute, which comprises in each stage of a plurality of interconnected like stages:
directly contacting a hot aqueous first liquid with a water immiscible second liquid having a boiling point lower than said first liquid in an evaporator zone, causing said immiscible second liquid to boil and form a vapor, said hot aqueous first liquid containing a nonvolatile solute;
contacting the vapor with water in a condenser zone, causing condensation of said vapor and heating said water by transfer of latent heat from the condensing vapor;
recycling said condensed immiscible second liquid from said condenser zone to said evaporator zone;
passing said hot aqueous first liquid in said evaporator zone of the first stage of said plurality of stages, to the evaporator zone of each successive stage, for boiling of said immiscible second liquid therein;
passing said water as feed into the condenser zone of the last stage of said plurality of stages and then to the condenser zone of each preceding stage, for condensing said vapor of said immiscible second liquid in each of said condenser zones;
withdrawing hot pressurized water from the condenser zone of the first stage of said plurality of stages, and expanding said pressurized water in an expander to produce work; and,
utilizing a portion of said hot pressurized water withdrawn from the condenser zone of said first stage, for separating water from an aqueous solution of a non-volatile solute, comprising the steps of:
introducing said hot pressurized water into a first stage of a plurality of interconnected like stages, each containing an evaporator zone and a condenser zone;
directly contacting said hot pressurized water with a water immiscible second liquid having a boiling point lower than water in said last mentioned evaporator zone, causing said immiscible second liquid to boil;
contacting the vapor of said immiscible second liquid generated during said boiling with a cooler aqueous liquid containing a non-volatile solute, in said last mentioned condenser zone, causing condensation of said vapor and heating said last mentioned cooler aqueous liquid;
recycling said condensed immiscible second liquid vapor from said condenser zone to said evaporator zone;
passing said hot pressurized water in said evaporator zone of the first stage of said plurality stages of, to the evaporator zone of each successive stage for boiling of said immiscible liquid therein;
passing said last mentioned aqueous liquid containing a non-volatile solute as feed into the condenser zone of the last stage of said plurality of stages and then to the condenser zone of each preceding stage to the first stage, for condensing said vapor of said immiscible second liquid in each of said condenser zones;

withdrawing said heated aqueous liquid from the condenser zone of said first stage and flashing said last mentioned aqueous liquid to generate water vapor; and, condensing said water vapor.

11. The process as defined in claim 10, wherein said immiscible second liquid is a hydrocarbon and said first liquid containing a non-volatile solute is an aqueous solution containing sodium cloride.

12. A heat transfer process for separating water from an aqueous solution containing a non-volatile solute, which comprises in each stage of a plurality of interconnected like stages:

directly contacting a hot aqueous first liquid with a water immiscible second liquid having a boiling point lower than said first liquid in an evaporator zone, causing said immiscible second liquid to boil;

contacting the vapor of said immiscible second liquid generated during said boiling with a cooler aqueous third liquid in a condenser zone, causing condensation of said vapor and heating said aqueous third liquid by transfer of latent heat from the condensing vapor, said aqueous third liquid being an aqueous solution containing a non-volatile solute;

recycling said condensed immiscible second liquid from said condenser zone to said evaporator zone;

passing said hot aqueous first liquid in said evaporator zone of the first stage of said plurality of stages, to the evaporator zone of each successive stage, for boiling of said immiscible second liquid therein;

passing said aqueous third liquid as feed into the condenser zone of the last stage of said plurality of stages and then to the condenser zone of each preceding stage, for condensing said vapor of said immiscible second liquid in each of said condenser zones;

withdrawing said heated aqueous third liquid from the condenser zone of the first stage and flashing said heated aqueous third liquid to generate water vapor, and condensing said water vapor; and, utilizing said flashed aqueous third liquid containing a non-volatile solute for recovery of energy therefrom, comprising the steps of:

introducing said last mentioned flashed aqueous liquid into a first stage of a plurality of interconnected like stages each containing an evaporator zone and a condenser zone;

directly contacting said flashed aqueous liquid with a water immiscible liquid having a boiling point lower than water in said last mentioned evaporator zone, causing said immiscible liquid to boil;

contacting the vapor of said immiscible liquid generated during said boiling with relatively cooler water in said last mentioned condenser zone, causing condensation of said vapor and heating said water;

recycling said condensed immiscible liquid vapor from said condenser zone to said evaporator zone;

passing said flashed aqueous liquid in said evaporator zone of the first stage of said plurality of stages to the evaporator zone of each successive stage for boiling of said immiscible liquid therein;

passing water as feed into the condenser zone of the last stage of said plurality of stages and then to the condenser zone of each preceding stage to the first stage, for condensing said vapor of said immiscible liquid in each of said condenser zones;

withdrawing hot pressurized water from the condenser of said first stage; and, expanding said pressurized water in an expander to produce work.

13. The process as defined in claim 12, wherein said immiscible second liquid is a hydrocarbon and said flashed aqueous third liquid containing a non-volatile solute is an aqueous solution containing sodium chloride.

14. A heat transfer system which comprises:

a plurality of unitary evaporator-condenser stages, each stage comprising a lower evaporator chamber and an upper condenser chamber;

means for introducing a hot aqueous first liquid into the evaporator chamber of the first stage of said evaporator-condenser stages and into contact with an immiscible second liquid therein to permit boiling of said immiscible second liquid;

means permitting passage of said immiscible second liquid vapors into the condenser chamber of said first stage;

first conduit means interconnecting the evaporator chambers of each of said stages, for passing said hot first liquid from the evaporator chamber of said first stage to the evaporator chambers of succeeding stages to the last stage;

means for introducing a aqueous third liquid into the condenser chamber of the last stage of said evaporator-condenser stages;

second conduit means interconnected the condenser chamber of each of said stages for passing said aqueous third liquid from the condenser chamber of the last stage successively into the condenser chambers of the preceding stages to the first stage; and, means interconnecting the condenser chamber and the evaporator chamber of each of said stages for recycling condensed immiscible second liquid from said condenser chamber to said evaporator chamber of each stage.

15. The system as defined in claim 14, including a bubble cap tray disposed between the evaporator-condenser chambers of each stage, said bubble cap tray having a plurality of bubble caps thereon to permit passage of the vapor of said immiscible second liquid from said evaporator chamber to said condenser chamber.

16. The system as defined in claim 14, including means for pumping third liquid from the condenser chamber of said last stage to the condenser chamber of each preceding stage to the first stage, and wherein said means interconnecting the condenser chamber and the evaporator chamber of each of said stages comprises a conduit permitting passage of condensed immiscible second liquid by gravity from the condenser chamber to the evaporator chamber.

17. The system as defined in claim 14, including:

a turbine for recovery of energy from the hot third liquid withdrawn from the condenser chamber of said first stage;

means for introducing said hot third liquid into said turbine; and, conduit means interconnecting the discharge of said turbine with the condenser chamber of said last stage for recycling discharged third liquid from said turbine to the condenser chamber of said last stage.

18. A heat transfer system which comprises:
a plurality of unitary evaporator-condenser stages, each stage comprising a lower evaporator chamber and an upper condenser chamber;
means for introducing a hot aqueous first liquid into the evaporator chamber of the first stage of said evaporator-condenser stages and into contact with an immiscible second liquid therein to pemit boiling of said immiscible second liquid;
means disposed in said evaporator chamber to promote mixing of said hot aqueous first liquid and said immiscible second liquid;
means permitting passage of said immiscible second liquid vapors into the condenser chamber of said first stage;
first conduit means interconnecting the evaporator chambers of each of said stages, for passing said hot first liquid from the evaporator chamber of said first stage to the evaporator chambers of succeeding stages to the last stage;
means for introducing a aqueous third liquid into the condenser chamber of the last stage of said evaporator-condenser stages;
second conduit means interconnecting the condenser chambers of each of said stages for passing said aqueous third liquid from the condenser chamber of the last stage successively into the condenser chambers of the preceding stages to the first stage;
means interconnecting the condenser chamber and the evaporator chamber of each of said stages for recycling condensed immiscible second liquid from said condenser chamber to said evaporator chamber of each stage.

19. A heat transfer system which comprises:
a plurality of unitary evaporator-condenser stages, each stage comprising a lower evaporator chamber and an upper condenser chamber;
means for introducing a hot aqueous first liquid into the evaporator chamber of the first stage of said evaporator-condenser stages and into contact with an immiscible second liquid therein to permit boiling of said immiscible second liquid;
means permitting passage of said immiscible second liquid vapors into the condenser chamber of said first stage;
first conduit means interconnecting the evaporator chambers of each of said stages, for passing said hot first liquid from the evaporator chamber of said first stage to the evaporator chambers of succeeding stages to the last stage;
means for introducing a aqueous third liquid into the condenser chamber of the last stage of said evaporator-condenser stages;
second conduit means interconnecting the condenser chamber of each of said stages for passing said aqueous third liquid from the condenser chamber of the last stage successively into the condenser chambers of the preceding stages to the first stage;
means interconnecting the condenser chamber and the evaporator chamber of each of said stages for recycling condensed immiscible second liquid from said condenser chamber to said evaporator chamber of each stage;
a flash chamber conduit means for withdrawing the heated third liquid from the condenser chamber of said first stage and introducing said heated aqueous third liquid into said flash chamber;
means for condensing the water vapor flashed from said aqueous third liquid in said flash chamber; and,
means for withdrawing said condensed water as product.

* * * * *